June 2, 1931. R. F. BACON 1,807,583
PRODUCTION OF ELEMENTAL SULPHUR FROM HYDROGEN
SULPHIDE AND SULPHUR DIOXIDE
Filed April 13, 1927
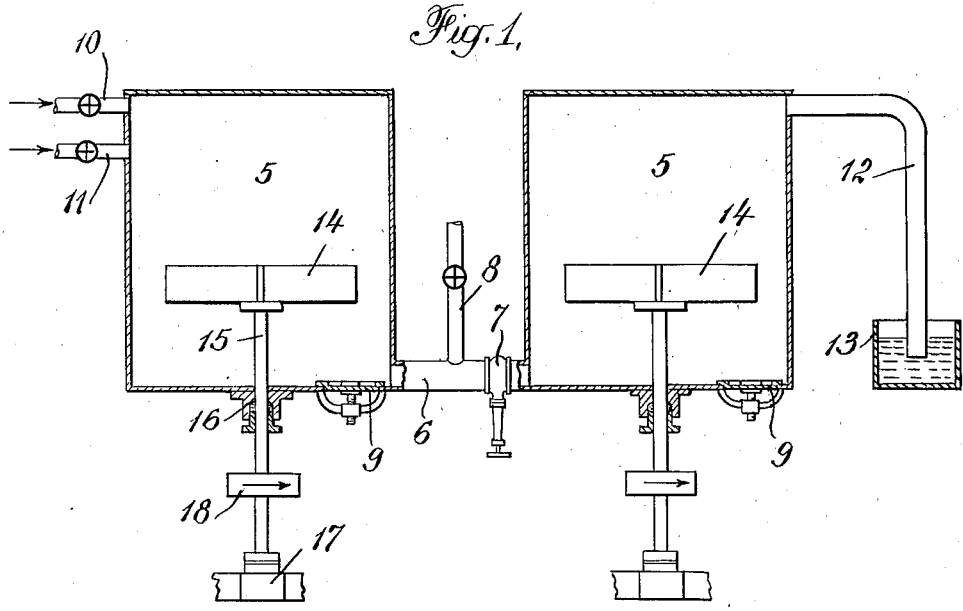
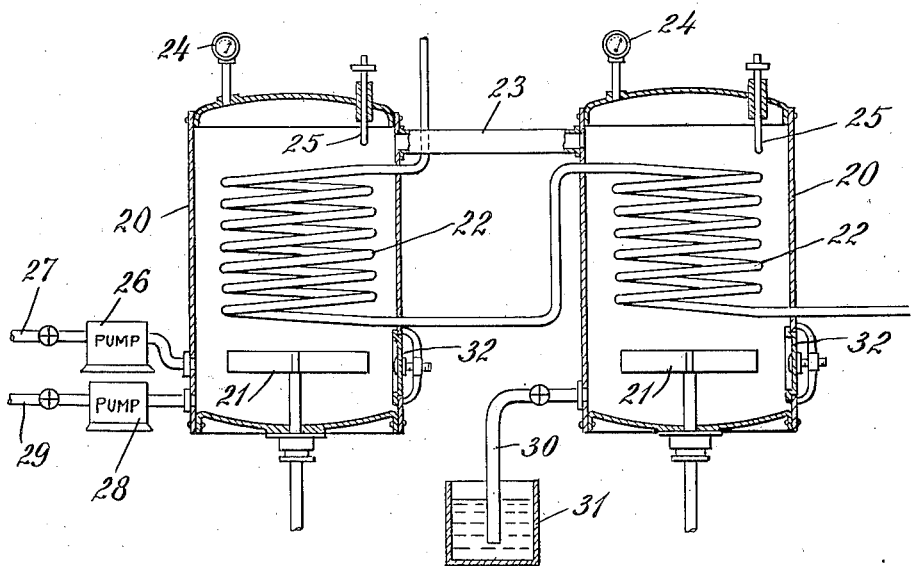
INVENTOR
Raymond F. Bacon
BY
Pennie, Davis, Marvin + Edmonds
ATTORNEYS Patented June 2, 1931

1,807,583

UNITED STATES PATENT OFFICE

RAYMOND F. BACON, OF BRONXVILLE, NEW YORK

PRODUCTION OF ELEMENTAL SULPHUR FROM HYDROGEN SULPHIDE AND SULPHUR DIOXIDE

Application filed April 13, 1927. Serial No. 183,437.

This invention relates to the production of elemental sulphur by the reaction between hydrogen sulphide and sulphur dioxide, and has for its object the provision of certain improvements in the procedure of carrying on the interaction of hydrogen sulphide and sulphur dioxide for the production of elemental sulphur.

It has long been known that hydrogen sulphide and sulphur dioxide will combine with one another to form elemental sulphur and water. Theoretically the reaction proceeds in accordance with the following equation:

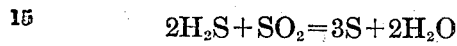
$$2H_2S + SO_2 = 3S + 2H_2O$$

In practice, however, the course of the reaction is erratic, and various factors and other reactions enter to such an extent that it is difficult to obtain a smooth reaction according to the above equation.

I have discovered that the reaction between hydrogen sulphide and sulphur dioxide can be made to take place both smoothly and completely if the reaction is carried out under pressure, and that this is true even where the reacting gases are present in very small amounts. I have further discovered that the reaction is substantially promoted and accelerated by violent agitation of the reacting gases.

My present invention is based on these discoveries and involves the production of elemental sulphur by the reaction between hydrogen sulphide and sulphur dioxide conducted under pressure, or conducted with violent agitation of the reacting gases, or, preferably, conducted with violent agitation of the reacting gases while subjected to an appropriate pressure. In the practice of the invention, I have found a pressure of from five to ten atmospheres to be satisfactory. While violent agitation of the reacting gases may be effected in any appropriate manner with attending improvement in the speed and completeness of the desired reaction, I have found that the optimum effect is obtained by the action of a rapidly whirling paddle.

The invention is of particular advantage when either the hydrogen sulphide or sulphur dioxide, or both, is contaminated or mixed with other gases. Under such conditions, the contaminating gases deleteriously affect the main reaction, probably by preventing the necessary intimate contact between the hydrogen sulphide and sulphur dioxide, or by reaction with hydrogen sulphide or sulphur dioxide with the consequent consumption of these gases to no useful purpose. Thus, when the sulphur dioxide is derived from the roasting of sulphide ores it is associated in the resulting roaster gas with oxygen, nitrogen and other gases. When such a roaster gas is brought into contact with hydrogen sulphide, the reaction between the hydrogen sulphide and the sulphur dioxide often stops before any degree of completeness is realized, and for reasons that are not entirely understood. If, however, the roaster gas and hydrogen sulphide are subjected to a pressure of from five to ten atmospheres, or are agitated by a rapidly whirling paddle, the desired reaction between the hydrogen sulphide and the sulphur dioxide proceeds smoothly and rapidly to completion.

As a result of my investigations and experiments, I have found that pressure and violent agitation, respectively, effect substantially equivalent improvement in promoting and accelerating the reaction between hydrogen sulphide and sulphur dioxide with the production of elemental sulphur. This has led me to the belief that the effect of the violent agitation is to produce localized and transient pressures within the reacting gas mixture, probably immediately in front of the advancing face of each rotating paddle. For this reason, I prefer to effect the violent agitation by means of rotating paddles that present to the gas mixture an advancing face of substantial area.

It will be understood from the foregoing discussion that my present invention contemplates the utilization of either pressure or violent agitation for promoting the reaction between hydrogen sulphide and sulphur dioxide. In my preferred practice, however, I make use of both pressure and violent agitation. By thus combining pressure with violent agitation I am able to obtain equally good results with the maintenance of relatively lower pressures and relatively lower degrees of agitation, than when pressure or violent agitation are used alone.

Various forms of apparatus are available for the practice of the invention. In the accompanying drawings I have illustrated two forms of apparatus satisfactory for the purpose. In the drawings, Fig. 1 is a diagrammatic sectional elevation of an apparatus for carrying out the invention with agitation, and Fig. 2 is a diagrammatic sectional elevation of an apparatus for carrying out the invention with agitation and/or under pressure.

The apparatus illustrated in Fig. 1 comprises two closed vessels or reaction chambers 5 connected by a conduit 6 having a valve 7. A valved pipe 8 communicates with the conduit 6. Each vessel 5 has a manhole 9, or other appropriate discharging means, in the bottom thereof. The first vessel 5 has two valved gas inlet pipes 10 and 11. The second vessel 5 has a gas outlet pipe 12 having its outer open end extending beneath an appropriate liquid in an open receptacle 13.

Each of the vessels 5 is provided with a rotatable agitator 14. The agitator shown in the drawings is of the cruciform type having four blades each of which in rotation presents an advancing face of substantial area to the gas mixture in the vessel. The agitator 14 is secured to the upper end of a vertical shaft 15 extending through an appropriate bushing 16 at the bottom of the vessel 5 and terminating in a step-bearing 17. Each agitator 14 is adapted to be driven by a pulley 18 from any suitable power source.

The operation of the apparatus shown in Fig. 1 will be generally understood from the foregoing description. Sulphur dioxide gas is introduced into the first vessel 5 from the supply pipe 10, and hydrogen sulphide gas is introduced from the supply pipe 11. In the vessel 5 the gas mixture is subjected to violent agitation from the rotation of the agitator 14. As previously stated, the agitators 14 have wide blades and are rotated at high speed. If desired, the gases from the vessel 5 may be exhausted through the pipe 8. Preferably, I convey the gases from the first vessel 5 through the conduit 6 to the second vessel 5 where the gas mixture is given a second treatment, the exhaust gases being withdrawn from the second vessel 5 through the pipe 12. The elemental sulphur formed in the vessels 5 is withdrawn from time to time through the manholes 9.

The apparatus of Fig. 2 comprises two closed vessels or reaction chambers 20 provided with agitators 21 and cooling coils 22. The vessels 20 are connected in series by a conduit 23. Each vessel is provided with a pressure gauge 24 and a temperature-measuring instrument 25, such as a pyrometer or thermometer.

Sulphur dioxide gas is forced by a pump 26 into the first vessel 20 from a supply pipe 27. Hydrogen sulphide gas is forced by a pump 28 into the first vessel 20 from a supply pipe 29. In the vessels 20, the gas mixture is subjected to the violent agitation of the rotating agitator 21 and is also subjected to a substantial pressure created by the pumps 26 and 28. The exhaust gases are withdrawn from the second vessel 20 through a valved outlet pipe 30 terminating an appropriate distance beneath the level of a body of liquid in a receptacle 31. The elemental sulphur formed in the vessels 20 is withdrawn from time to time through the manholes 32.

I claim:

1. The improvement in the production of elemental sulphur by the reaction between hydrogen sulphide and sulphur dioxide characterized by subjecting the reacting gases to a sufficient pressure to substantially promote the reaction between hydrogen sulphide and sulphur dioxide with the formation of elemental sulphur.

2. The improvement in the production of elemental sulphur by the reaction between hydrogen sulphide and sulphur dioxide which comprises subjecting the reacting gas mixture containing hydrogen sulphide and sulphur dioxide to a pressure of five to ten atmospheres.

3. The improvement in the production of elemental sulphur by the reaction between hydrogen sulphide and sulphur dioxide which comprises subjecting the reacting gas mixture containing hydrogen sulphide and sulphur dioxide to the action of a rapidly whirling paddle presenting to the reacting gas mixture an advancing face of substantial area.

4. The improvement in the production of elemental sulphur by the reaction between hydrogen sulphide and sulphur dioxide which comprises subjecting the reacting gas mixture containing hydrogen sulphide and sulphur dioxide to the combined action of a rapidly whirling paddle and a pressure of five to ten atmospheres.

5. The method of producing elemental sulphur from hydrogen sulphide and roaster gas containing sulphur dioxide which comprises mixing the hydrogen sulphide and roaster gas and subjecting the resulting gas mixture to a pressure of five to ten atmospheres and thereby producing elemental sulphur by the reaction between hydrogen sulphide and sulphur dioxide.

6. The method of producing elemental sulphur from hydrogen sulphide and roaster gas containing sulphur dioxide which comprises mixing the hydrogen sulphide and roaster gas and subjecting the resulting gas mixture to the action of a rapidly whirling paddle presenting to the gas mixture an advancing face of substantial area and thereby producing elemental sulphur by the reaction between hydrogen sulphide and sulphur dioxide.

7. The method of producing elemental sulphur from hydrogen sulphide and roaster gas containing sulphur dioxide which comprises mixing the hydrogen sulphide and roaster gas and subjecting the resulting gas mixture to the combined action of a rapidly whirling paddle and a pressure of five to ten atmospheres, and thereby producing elemental sulphur by the reaction between hydrogen sulphide and sulphur dioxide.

8. The method of producing elemental sulphur from hydrogen sulphide and roaster gas containing sulphur dioxide which comprises mixing the hydrogen sulphide and roaster gas and subjecting the resulting gas mixture to the combined action of a pressure of five to ten atmospheres and violent agitation with transient pressure and thereby producing elemental sulphur by the reaction between hydrogen sulphide and sulphur dioxide.

9. The method of producing elemental sulphur from hydrogen sulphide and roaster gas containing sulphur dioxide which comprises mixing the hydrogen sulphide and roaster gas and subjecting the resulting gas mixture to a pressure of five to ten atmospheres and violent agitation with localized pressure and thereby producing elemental sulphur by the reaction between hydrogen sulphide and sulphur dioxide.

In testimony whereof I affix my signature.

RAYMOND F. BACON.